Figure 1:
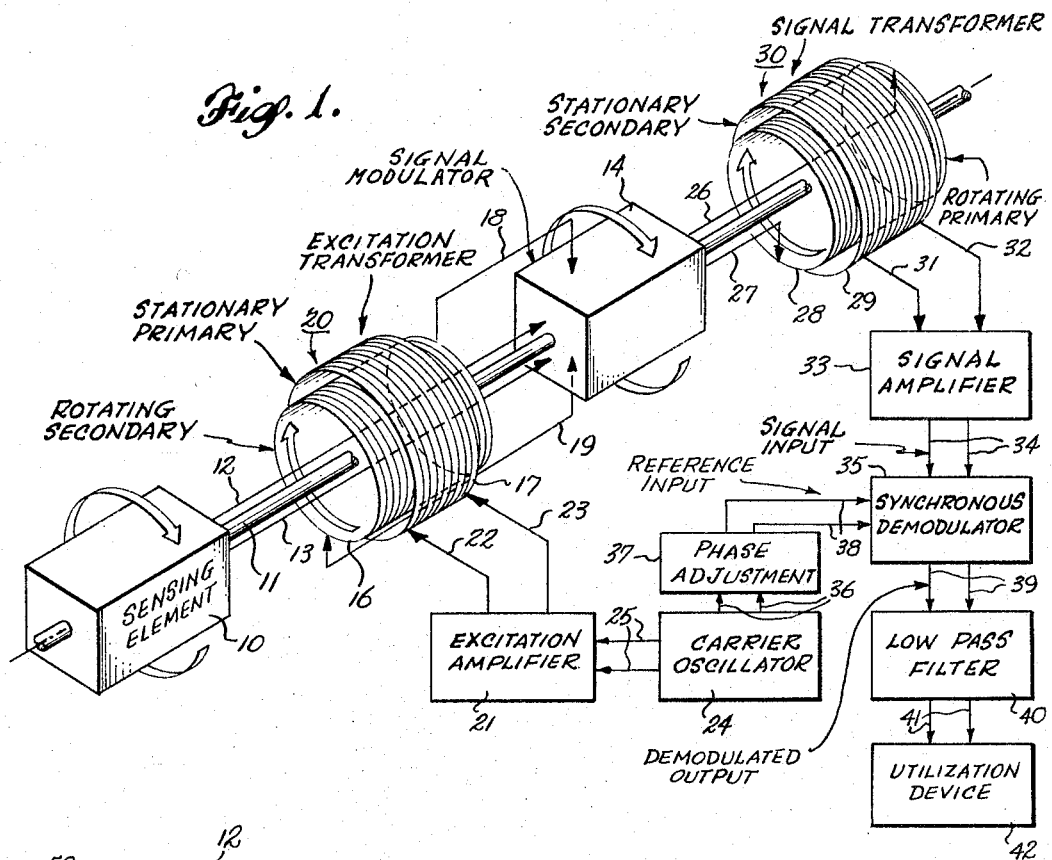

INVENTOR.
GLEN E. MILLER
BY Reynolds & Christensen
ATTORNEYS

Aug. 23, 1966  G. E. MILLER  3,268,880
TELEMETRY SYSTEM
Filed March 23, 1964  2 Sheets-Sheet 2
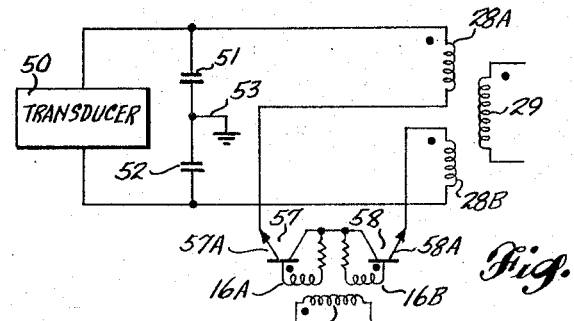
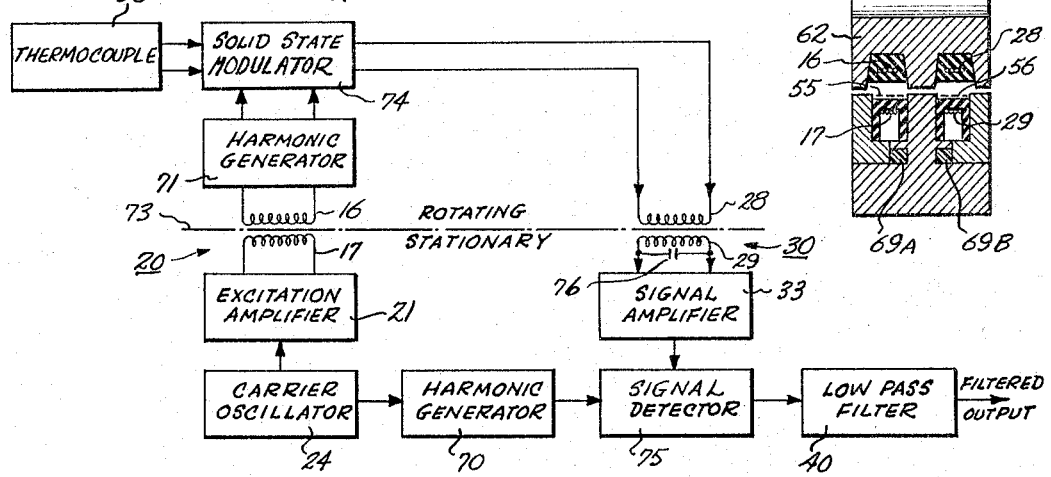
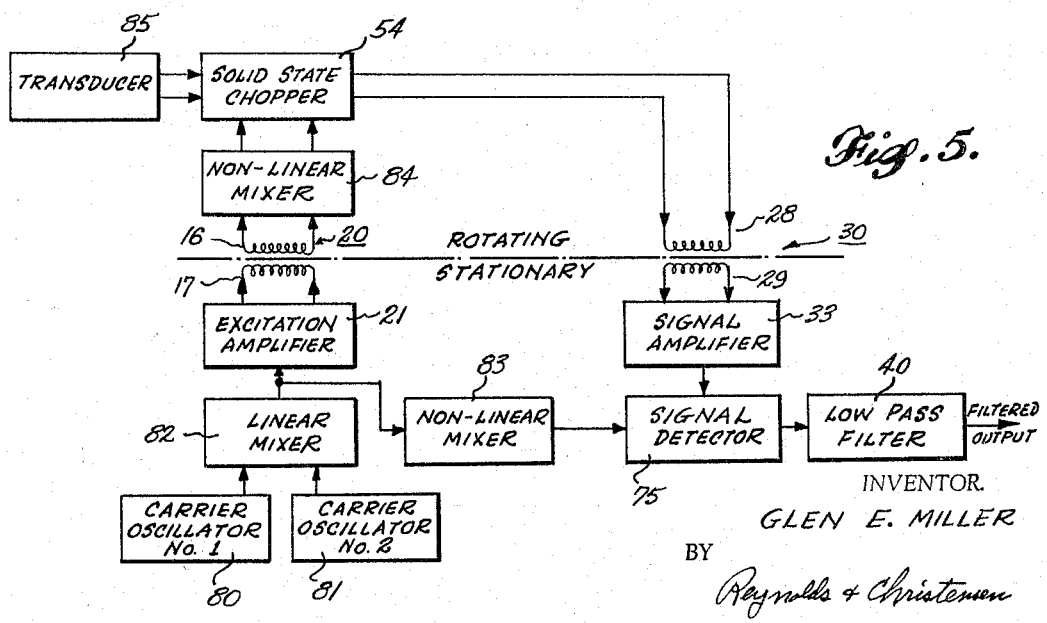
INVENTOR.
GLEN E. MILLER
BY
Reynolds & Christensen
ATTORNEYS United States Patent Office
3,268,880
Patented August 23, 1966

3,268,880
TELEMETRY SYSTEM
Glen E. Miller, Redondo Beach, Wash., assignor to The Boeing Company, Seattle, Wash., a corporation of Delaware
Filed Mar. 23, 1964, Ser. No. 354,042
12 Claims. (Cl. 340—207)

The present invention relates to telemetry systems for use with rotating machinery and more particularly to an improved apparatus particularly adapted for transmitting information from a rotating information generating apparatus to a stationary indicating or information reduction and/or control system.

It is often necessary in the field of machine design and other analogous arts that measurements of certain quantities be made on rotating elements. For example, the temperature and stress within a rotating element such as the rotor of an electrical motor have been measured using systems wherein the physical condition to be measured is converted into proportional electrical voltages by various types of transducers. In the prior art such electrical signals representing the desired information have generally been transmitted from a transducer moving with the moving machine elements to a stationary data reduction and/or control system by means of friction devices such as the well-known slip rings or brush assemblies. While the use of slip rings does provide one means of obtaining useful information from the rotating sensor, wear of the slip rings or brush assemblies as well as loading of the rotating system by the slip rings frequently impairs the system operation and also limits the time for which the system can be reliably operated without maintenance and replacement of parts. In addition, electrical contact noise is generally introduced into the system by the use of slip rings. At high rotational speeds brush friction often causes severe heating problems which leads to the requirement for circulating coolants. This frequently reduces the life expectancy of the brushes to an extent which renders them unsuitable for use at high rotational speeds.

It is therefore an object of the present invention to provide an improved apparatus for obtaining information in the form of electrical signals from a moving element such as a rotating shaft and transmitting such signals to a data reduction or indicating system which is stationary with respect to the shaft without the use of slip rings or other friction type current carrying devices.

Another object of the present invention is to provide an improved system for obtaining information regarding a physical characteristic such as the temperature of a rotating member without the use of friction devices for carrying current from a temperature sensitive element moving with the rotating member.

A further object of the present invention is to provide an improved signal information system having a long operating life for deriving information from a rotating element and providing such information to a stationary data reduction or indicating system without the use of friction type current carrying devices and without materially loading the drive for the rotating element.

Another object of the present invention is to provide an improved telemetry system adapted for use with a rotating sensing element such as a thermocouple using a simplified electronic system which does not require a rotating D.C. power source and does not require friction elements such as slip rings or brush assemblies for carrying electrical signals from the transducer.

In accordance with the teachings of the present invention a suitable sensor or signal generating device such as a thermocouple is properly positioned on a moving element such as the rotating shaft of an electric motor and in a position to provide electrical signals which are proportional to and vary in accordance with variations of the physical quantity being measured. In one example illustrated herein, the physical quantity being measured is the temperature of the interior portions of an electric motor. A small signal translating element such as a solid-state device operated as a modulator has the output signals from the transducer applied thereto. Signals thus serve to modulate the output of the device. Suitable power is provided for operation of the solid-state device by means of a pair of inductors maintained in mutual energy exchange relationship with the second inductor rotating with and connected to the solid-state device. An excitation signal is applied to the first stationary inductor to thereby provide a changing magnetic field for the second inductor. Thus the first and second inductors serve as an excitation transformer with carrier frequency signal energy being provided from a suitable excitation amplifier through the transformer to the rotating signal translating device.

A second transformer which may be termed an information or signal transformer is composed of third and fourth inductors placed in energy exchange relationship with the third inductor rotating with the transducer and signal translating device and having its terminals coupled with the output terminals of the device. The fourth inductor is stationary and is aligned with the third inductor so that variations in the magnetic field of the third inductor caused by the output signals of the rotating signal translating device will give rise to corresponding signals in the fourth stationary inductor. The signals generated in the fourth inductor are applied to a signal amplifier which serves to increase the level of the signals. The amplified signals are then applied to a suitable demodulator and signal filtering network so that the carrier frequency signal is removed and only the information produced by the transducer is provided to a suitable data reduction, control, or indicating system. The central axes of the inductors used for the excitation transformer and the signal transformer are maintained parallel to and preferably coincident with the axis of rotation of the shaft in order to eliminate or materially reduce noise which might be generated as a result of rotation of the rotating inductors. In addition, the two transformers are preferably isolated to as large an extent as possible in order to avoid intercoupling of magnetic fields therebetween. Faraday shielding may be utilized to reduce the effects of stray electric fields which are present as a result of excitation of the transformers.

To further reduce the effect of intercoupling of energy between the two transformers and the effect thereof on the ultimate output signals a synchronous demodulation system is used with the carrier signal oscillator used for applying signals to the excitation amplifier being connected to a synchronous demodulator which receives the signals from the signal amplifier. A harmonic signal generator may be included with the rotating modulator so that the signals detected, amplified, and provided at the output side of the signal amplifier will be at a harmonic frequency which is modulated by the transducer with said harmonic being absent in the signals applied to the excitation transformer. By suitably tuning the secondary of the signal transformer to the selected harmonic the effect of any stray fields generated by the excitation transformer are substantially eliminated. A similar harmonic generator which is energized by the carrier oscillator serves to provide an input signal to a synchronous demodulator to serve as a base for detection of the information generated by the transducer and amplified by the signal amplifier. In an additional embodiment, signals at the frequency of the sum or difference between the frequencies of a pair of carrier oscillators are used in a manner such that the modulated carrier signal applied to the signal amplifier by the signal transformer is at a frequency which is not present in the excitation signals applied to the excitation transformer. Thus the effect of any intercoupling of magnetic fields between the excitation transformer and the signal transformer is substantially eliminated. As a result thereof extremely low level signals from the transducer may be detected, amplified, and applied to any suitable utilization device such as a data reduction, control, or indicating system.

Figure 2:
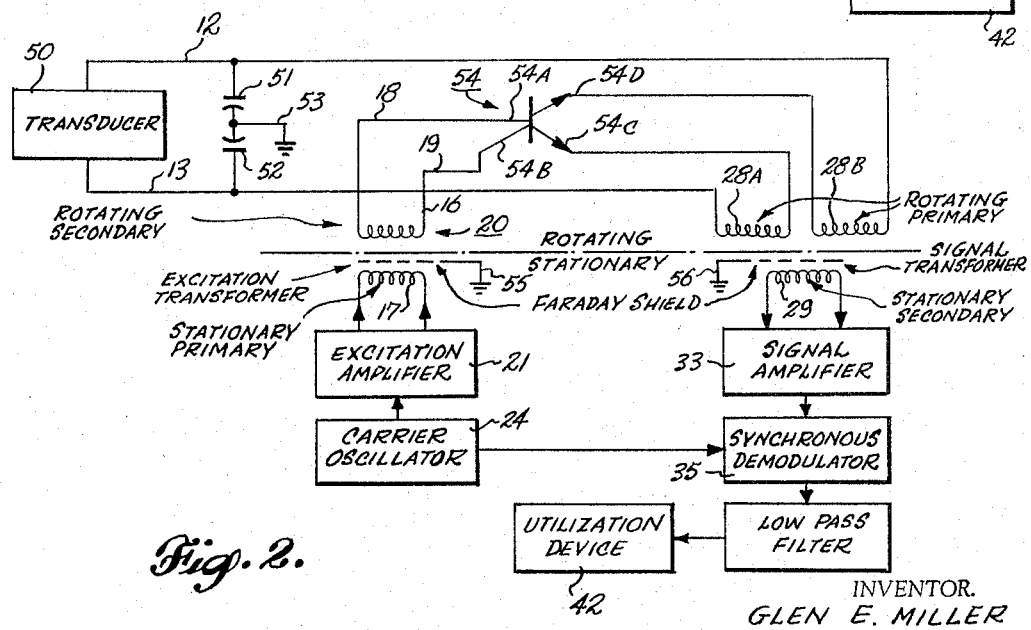

The above as well as additional advantages and objects of the present invention will be more clearly understood from the following description when read with reference to the accompanying drawings wherein, FIGURE 1 is a diagrammatic illustration a portion of which is an orthographic projection illustrating one embodiment of the improved system provided in accordance with the present invention, FIGURE 2 is a schematic circuit diagram with part of the elements shown in block form illustrating a specific circuit arrangement for carrying out the teachings of the present invention, FIGURE 2A is a schematic circuit diagram illustrating an embodiment of the rotating elements using a transistor chopper circuit and including the stationary windings of two transformers used in the system, FIGURE 3 is a cross section of an embodiment of the invention showing the construction details of a rotor and associated rotating inductors carried therewith as well as the details of the associated stationary inductors, FIGURE 4 is a block diagram illustrating an embodiment of the present invention which includes the use of harmonic signal generating techniques, and FIGURE 5 is a block diagram of a further embodiment of the present invention which makes use of a pair of carrier oscillators in a manner such that the effect of intercoupling of magnetic fields between the two transformers of the system is substantially eliminated.

Referring now to the drawings and in particular to FIGURE 1 there is illustrated a sensing and signal generating element 10 which is shown as being carried by a power driven shaft 11. The shaft 11 may, for example, be the shaft supporting and part of the armature of an electric motor or any other rotating device the characteristics of which are desired to be sensed. The signal generating sensing element 10 can be any of a number well known in the art and is preferably a transducer such as a thermocouple or a strain gauge. Such devices, as is well known in the art, provide output electrical signals which represent and are proportional to a physical characteristic of a particular nature such as temperature or strain.

As seen in FIGURE 1, the element 10 has a pair of signal output leads 12 and 13 which are connected to a suitable signal translating device or modulator 14 which is similarly carried by the shaft 11 and serves as a D.C. to A.C. signal converter. As described with more detail hereinafter, the signal translating device 14 can be a solid-state device or assembly of devices such as transistors or any of a number of well known devices which will serve to provide output signals composed of the carrier signals applied thereto and modulated by the sensing element 10. One readily available device is commonly referred to in the art as a solid-state chopper which does not require a source of direct current in order to perform the functions necessary in accordance with the present invention and thus does not require a rotating source of direct current to operate. A pair of conventional transistors could similarly be used as the device 14 since the primary function of the device 14 is to provide output signals which are modulated by the input signals applied thereto by the sensing element 10 and which are suitable for actuating the signal transformer described hereinafter.

A first inductive element shown as a winding 17 is stationary with respect to a second inductive element or winding 16 which is secured to the shaft 11 and hence is adapted for rotation therewith. Leads 18 and 19 will be seen to be connected to the device 14 from the rotating inductor 16. The stationary winding 17 is disposed about the first inductor 16 in a manner to provide maximum coupling therebetween with a minimum of noise caused by rotation of inductor 16, said inductors 16 and 17 comprising an excitation transformer 20. The central longitudinal axes of inductors 16 and 17 are maintained parallel to and in the embodiment of FIGURE 1 coincident with the axis of rotation of the shaft 11. Thus error signals which might be generated as a result of rotation of the inductor 16 are minimized.

An excitation amplifier 21 will be seen to have its signal output terminals 22 and 23 connected to the stationary winding 17 of the excitation transformer 20. The excitation amplifier 21 is any one of a number of well-known amplifiers which will serve to provide carrier signals to the inductor 17 and hence cause variations in the electromagnetic field coupling the inductors 16 and 17. The excitation amplifier 21 is in turn controlled by a carrier signal oscillator 24 which is shown as being connected by signal leads 25 to the excitation amplifier 21. The arrangement is such that in response to signals from the carrier oscillator 24 the excitation amplifier 21 applied varying electric signals to the inductor 17 and hence corresponding varying electrical signals are applied to the device 14 by the secondary winding 16. As described hereinafter, the particular frequency selected can vary over a wide range since the information desired is the modulation applied to the carrier signal by the signals generated by the sensing element 10.

The signal translating device 14 will be seen to have a pair of signal output leads 26 and 27 connected thereto which are directly connected to a third inductor 28 illustrated as being carried by the rotating shaft 11. The third inductor 28 may be appropriately termed the rotating primary of a second transformer 30 with the secondary winding of the transformer 30 being the stationary fourth inductor 29 placed in energy exchange relationship with the primary winding 28. Since the transformer 30 provides the coupling means for applying signals of transducer 10 to the stationary system it is referred to as a signal transformer. As is the case with the excitation transformer 20, the primary and secondary windings 28 and 29 of the signal transformer 30 have their central longitudinal axes maintained as close as possible coincident with the axis of rotation of the shaft 11. As is disclosed in more detail hereinafter, the specific mounting of the inductors 16 and 28 on the shaft 11 and the inductors 17 and 29 in the immediate vicinity thereof can be accomplished in various ways.

The leads 31 and 32 which are connected to the fourth inductor 29 will be seen to be connected to a signal amplifier 33 having signal output leads 34 connected to a suitable demodulator which for purpose of illustration is shown as a synchronous demodulator 35. Signals from the carrier oscillator 24 are applied over leads 36 to a phase adjustment device 37 and thence by leads 38 to the synchronous demodulator 35. As is well known in the art, the synchronous demodulator 35 can be any one of a number common in the art, as for example one making use of diode detectors, and which is responsive to the signals provided directly by the carrier oscillator 24 and to the signals provided by the signal amplifier 33 to provide demodulated output signals over leads 39 to a suitable low pass filter network 40. The filter network 40 serves to pass only the low frequency signals corresponding to the modulation provided by the signal generator 10. The signals provided from the low pass filter 40 are applied to any suitable utilization device 42 by means of the leads 41. The utilization device 42 can be one of a number of types depending upon the result desired. For example, a meter indicating the temperature or strain of the apparatus to which the sensing element 10 is responsive may be included in the device 42. The utilization device 42 can similarly include a data recording device or a suitable control device for applying corrective signals or controls to the apparatus to which the sensing element 10 is responsive (for example, to adjust the temperature).

The operation of the embodiment of the invention illustrated in FIGURE 1 is as follows. As the shaft 11 rotates the sensing element 10 provides output signals on the leads 12 and 13 which are proportional to the temperature, strain or other characteristic of the rotating element being sensed. The carrier oscillator 24 serves to cause the excitation amplifier 21 to apply varying electric signals to the primary winding 17 of the excitation transformer 20. As a result thereof the signal translating device 14 is provided with carrier signals from the secondary winding 16 and with information signals from the source 10. Modulated output signals are therefore provided via the leads 26 and 27 to the rotating primary winding 28 of the signal transformer 30. The stationary secondary winding 29 of the signal transformer 30 detects such signals and applies them to the signal amplifier 33. The amplified signals from the signal amplifier 33 and signals from the carrier oscillator 24 are then applied simultaneously to the demodulator 35. In the preferred embodiment of the invention shown in FIGURE 1 a suppressed carrier system is used which means that in the absence of signals from the sensing element 10 there is no excitation of transformer 30 and hence no signal to amplifier 33. This reduces the required dynamic range of the amplifiers. If a non-synchronous demodulator or signal detector is used a zero base is established in the signal amplifier 33 or the output circuit corresponding to a condition of only carrier signals in the transformer 30. In the system of FIGURE 1 the phase adjustment device 37 is preferably adjusted during the occurrence of signals from the sensing element 10 to achieve maximum signal level of signals provided to the utilization device 42. From FIGURE 1, therefore, it will be seen that without the use of friction type current conductors such as slip rings information provided by the sensing element 10 carried with moving members of the system is applied to a suitable utilization device 42. As described hereinafter, the system of FIGURE 1 is readily modified to enhance the operation of the overall system.

The embodiment of the invention illustrated in FIGURE 2 is substantially the same as that illustrated in 1, but with various components being illustrated with more particularity in order to show specific circuit connections for carrying out the invention. Similar elements carry the reference numerals in FIGURE 2. Referring now to FIGURE 2, it will be seen that a transducer 50 which is preferably a thermocouple has a pair of capacitors 51 and 52 connected across its signal leads 12 and 13 with the central connection between capacitors 51 and 52 being connected to signal ground by an appropriate lead 53. A four terminal solid-state signal translating device commonly referred to in the art as a solid-state chopper 54 is illustrated as having its base electrode 54A and collector electrode 54B directly connected to the rotating secondary winding 16 of the excitation transformer 20. The rotating primary of the signal transformer 30 will be seen to include the windings 28A and 28B, the rotating primary being split to provide a more balanced A.C. circuit. It will be seen that the winding 28A is connected in series circuit between the signal output lead 13 from the transducer 50 and a first emitter electrode 54C of the solid-state chopper 54 while the winding 28B is similarly connected in series circuit with a second emitter electrode 54B of the chopper 54 and the signal output lead 12 from the transducer 50. The capacitance of the capacitors 51 and 52 is such that a low impedance is presented to the chopper input at the selected signal chopping rate.

The operation of the embodiment of the invention in FIGURE 2 corresponds generally to that set forth above in connection with FIGURE 1 in that the carrier signals provided to the chopper 54 by the excitation transformer 20 are modulated by the signals from transducer 50 with the result that modulated carrier signals are sensed in the secondary winding 29 of the signal transformer 30. Accordingly, after amplification by the amplifier 33 and demodulation in the synchronous demodulator 35, the desired output information is provided to the utilization device 42 from the low-pass filter network 40. It will be seen in FIGURE 2 that a transducer, a pair of capacitors, a solid-state chopper, and the rotating secondary winding 16 and primary windings 28A and 28B are the only things which are required to be carried by the rotating system. As is well known in the art, each of these elements can be made extremely small and of relatively low weight. As a result, there is very little loading of the rotating system as a result of the mass of these components and, in addition, the requirement for brushes or slip rings is completely eliminated. Accordingly, an extremely reliable and long-life system is provided which requires little or no checking or maintenance.

In the embodiment of the invention illustrated in FIGURE 2 Faraday shields 55 and 56 are disposed adjacent to the stationary transformer windings 17 and 29 in order to serve as an effective shield for the electric fields associated with the transformer windings.

As indicated above, the solid-state chopper 54 of FIGURE 2 has been found to work well in the system of the present invention since it has a low mass and does not require the use of a rotating D.C. power supply. Other types of amplifiers or signal translating devices have also been found to work well in the system, and therefore there is illustrated in FIGURE 2A an embodiment of the rotating elements making use of transistors. Referring now to FIGURE 2A, wherein the various parts from the system of FIGURE 2 bear like reference numerals, it will be seen that the secondary winding of the excitation transformer 20 is a split winding including inductors 16A and 16B. Inductor 16A will be seen to be connected in the base-collector circuit of a first transistor 57 with inductor 16B being connected in the base-collector circuit of a second transistor 58. The transistors are shown for purpose of illustration as NPN transistors but as is well known in the art, PNP type transistors can similarly be used. It will be seen that the emitters 57A and 58A are respectively connected to the inductors 28A and 28B in the same manner as are the emitters 54B and 54C of the chopper 54 in FIGURE 2. The operation of the circiut of FIGURE 2A is substantially identical to that of FIGURE 2 in that the carrier signals applied to the transistors 57 and 58 by transformer 20 will cause the transistors to operate as a chopper with output signals in the inductors 28A and 28B being modulated by the signals from the transducer 50.

Referring now to FIGURE 3 there is illustrated with more particularity a cross-sectional view of an embodiment of the invention as applied to an electric motor system. In FIGURE 3 it will be seen that the rotating inductors 16 and 28 are wound upon and embedded in glass yarn impregnated with an epoxy resin to form the members 60 and 61 within the grooves provided in the aluminum rotor 62. The rotor 62 is provided with a central cavity 63 which serves to hold the rotating electronic elements previously described. The axis of rotation is indicated by the center line 64. The stator 66 of the system will be seen to have the inductors 17 and 29 positioned therein by means of said inductors being wound about the dielectric bobbins 67 and 68 which are then inserted in corresponding openings in the aluminum stator. Radio frequency shielding is provided by the RF gaskets 69A and 69B. Faraday shields 55 and 56 made of conductive material are printed around the inside of the stator 66 on top of the dielectric bobbins which carry the inductors 17 and 29. Thus it will be seen that a compact system is provided including means for holding the rotating electronic components near the axis of rotation.

In one apparatus constructed in accordance with the teachings set forth herein and as illustrated in FIGURE 3 the total rotational effects observed due to rotation of the various components was maintained to a few tenths of one percent of a full scale transducer output signal using an air gap of 0.010 inch between the rotor 62 and stator 66. The complete rotor assembly was only one inch long and two inches in diameter. A carrier frequency of 450 kilocycles was used to accommodate an information bandwidth of 20 kilocycles and was used with the system operating at speeds up to 50,000 revolutions per minute. A solid-state chopper manufactured by the National Semiconductor Corporation of Danbury, Conn., and sold under its identification of NS–3001 was found to be suitable for use in the system, the signal sensing element having been a thermocouple. Various other well known solid-state choppers including pairs of NPN or PNP transistors also work well.

While the apparatus thus far described is found to work well, various modifications thereof can be made in order to further eliminate any tendency for error signals to be generated as a result of undesirable intercoupling of fields between the windings of the two transformers. Such intercoupling of fields can be reduced or eliminated by placing the stationary inductors at great distances from each other. However, in practice, it is frequently necessary to maintain the physical size of the system as small as possible and, therefore, of necessity the various inductors are placed in the close proximity of each other. For example, as stated above in regard the embodiment of the invention constructed in accordance with FIGURE 3, the complete rotor assembly was only one inch long and two inches in diameter and thus it will be seen that the inductors are very close to each other. Accordingly, the modification illustrated in FIGURE 4 can be used to reduce or eliminate any error signals which might be caused in applications requiring the various inductors to be located near to each other.

Referring now to FIGURE 4 it will be seen that in addition to the various components illustrated in FIGURES 1 and 2 the system of FIGURE 4 includes a pair of harmonic signal generators 70 and 71 which produce signals at frequencies $n(f_1)$ which are harmonics of the signals applied thereto at the frequency $f_1$ by the carrier oscillator. The harmonic signal generator 71 will be seen to be carried with the rotating system and is connected between a solid-state modulator 74 and the rotating secondary winding 16 of the excitation transformer 20. To clarify the illustration in FIGURE 4 a center line 73 has been drawn with the elements above the center line being rotating elements, while those elements below the center line are maintained stationary. In practice the rotating circuit components are small enough to fit easily into the cavity 63 of the embodiment of FIGURE 3. The harmonic generator 70 which is connected between the carrier oscillator 24 and the detector 75 is part of the stationary system and serves to apply signals to the detector 75 in response to signals from the carrier oscillator 24. The harmonic generators 70 and 71 as well as the amplifiers and oscillators can be any of a number of types well known in the art and therefore additional details are not included herein. Preferably the harmonic generator 71 is of the commonly known type which includes solid-state devices such as semiconductor diodes in order to maintain the mass thereof as low as possible. The basic operation of the system illustrated in FIGURE 4 is substantially the same as the operation of the systems of FIGURES 1 and 2 with the major change being that the desired signal information is transmitted from primary to secondary of the signal transformer 30 at a carrier frequency $n(f_1)$ which is different from the frequency $f_1$ at which carrier signals are transmitted in the excitation transformer 20. Since the energizing signals for the harmonic generator 71 as provided by the excitation transformer 20 do not include the harmonic frequencies but only the carrier oscillator frequencies as provided by the oscillator 24, it will be seen that any stray magnetic fields which intercouple the excitation transformer 20 and the signal sensing transformer 30 will have little or no effect on the information applied to the signal amplifier 33. The stationary secondary winding 29 of the signal transformer 30 is preferably tuned to discriminate between signals at the frequency of the harmonic signal generator 71 and the excitation amplifier frequency to further reduce the effect of any stray magnetic fields. For purpose of illustration a capacitor 76 is illustrated as being connected in parallel with the inductor 29 to indicate a tuned circuit. By using the system of FIGURE 4 the signals applied to the signal amplifier 33 by the transformer 30 will be primarily at the harmonic generator signal frequency as modulated by the output signals from the thermocouple 50 and therefore the effect of the fields associated with transformer 20 are substantially eliminated.

The embodiment of the invention illustrated in FIGURE 5 operates in a manner similar to that of the embodiment of FIGURE 4 in that the effect of stray fields from the two transformers is substantially eliminated to thereby permit a very compact system. Referring now to FIGURE 5 it will be seen that a pair of carrier signal oscillators 80 and 81 are connected to the input of a linear signal mixer 82. As a result of the linearity of the first mixer 82 signals at the two frequencies $f_1$ and $f_2$ of the oscillators 80 and 81 will be simultaneously applied to the excitation amplifier 21 and to a stationary non-linear signal mixer 83. The excitation amplifier 21 therefore provides amplified carrier signals at the two frequencies $f_1$ and $f_2$ to the excitation transformer 20. A low weight nonlinear signal mixer 84, such as is readily assembled utilizing semiconductor diodes in any one of a number of circuit arrangements known in the art, is carried with the rotating system and is provided with energizing signals from the rotating secondary winding 16 of the excitation transformer 20. As a result of the nonlinearity of the mixer 84 carrier signals at the sum or difference frequencies $f_1+f_2$ or $f_1-f_2$ are applied to the solid-state chopper for modulation by the output signals from the transducer 85. The nonlinear mixers 83 and 84 are substantially identical and therefore it will be seen that the frequency of the carrier signals applied to the solid-state chopper and to the detector 75 will be the same and also it will be seen that the frequency of the signals applied to the excitation transformer 20 by the amplifier 21 and to the signal amplifier 33 by the solid-state chopper 54 will be different. Accordingly, the effect of any magnetic fields generated by the excitation transformer 20 and coupled to the inductors of the transformer 30 will be rendered ineffective to cause error signals in the signals applied to the signal amplifier 33. As in the embodiment of the invention illustrated in FIGURE 4, the signal transformed 30 is tuned to the sum or difference frequency $f_1+f_2$ or $f_1-f_2$. Therefore the signals produced by the excitation transformer 20 at the frequencies $f_1$ and $f_2$ of the carrier oscillators 80 and 81. As a result thereof the noise level of the system is held to a minimum and very low level signals from the transducer 85 will suffice to provide the desired output information to a suitable utilization device.

There has thus been disclosed an improved telemetry system particularly adapted for use with rotating machine elements wherein it is necessary to transmit electrical information signals from a rotating element. It will be seen that the use of slip rings or brush assemblies is completely eliminated and hence a long life system is provided with little or no loading of the rotating system. By utilizing the teachings of the present invention a very compact system is provided with the usual problems associated with intercoupling of magnetc fields between the inductors of such a system being substantially eliminated. It will, of course, be obvious to those skilled in the art that various changes and modifications of the present invention can be made within the scope of the following claims without departing from the inventive concepts disclosed herein.

What is claimed is:

1. A system for obtaining information from a rotating member comprising in combination: sensing means adapted to provide information signals; an excitation transformer including a primary winding and a secondary winding; a signal transformer including a primary winding and a secondary winding; signal translating means coupled with said sensing means, said secondary winding of said excitation transformer, and said primary winding of said signal transformer; support means supporting said sensing means, said signal translating means, said secondary winding of said excitation transformer, and said primary winding of said signal transformer for simultaneous rotation; carrier signal excitation means coupled with said primary winding of said excitation transformer; and signal output means connected to said secondary winding of said signal transformer adapted to provide output signals representative of said information signals, said output means including signal demodulator means connected to and controlled by said excitation means and also connected to said secondary winding of said signal transformer.

2. A system in accordance with claim 1 and including additional means carried with said support means connected between said signal translating means and said secondary winding of said excitation transformer adapted to provide carrier signals to said signal translating device at a frequency different from the frequency of the signals applied to said primary winding of said excitation transformer.

3. A system in accordance with claim 2 wherein said additional means includes a harmonic signal generator.

4. A system in accordance with claim 2 wherein said carrier signal excitation means includes means for applying signals at first and second frequencies to said primary winding of said excitation transformer and wherein said additional means includes means responsive to signals at said first and second frequencies to apply signals at the sum and difference frequencies of said first and second frequencies to said signal translating device.

5. A system in accordance with claim 2 wherein said additional means includes a first non-linear signal mixer, and wherein said system includes a second non-linear signal mixer connected between said carrier signal excitation means and said demodulator means.

6. A telemetry system comprising in combination: information signal generating means; signal chopper means connected to said means; excitation means including an excitation transformer having a secondary winding coupled with said signal chopper means adapted to apply carrier frequency signals thereto; a signal transformer having a primary winding coupled with said signal chopper means; means supporting said signal generating means, said signal chopper means, and each of said windings for simultaneous rotation; and signal output means coupled with said signal transformer adapted to provide output signals corresponding to the signals generated by said signal generating means, said signal output means further including synchronous signal detector means coupled with said signal excitation means for control thereby and with said signal transformer for receiving modulated information signals therefrom.

7. A system in accordance with claim 6 wherein: said excitation means includes a linear signal mixer, means for applying signals of first and second frequencies thereto, an excitation amplifier connected to said mixer and to said excitation transformer adapted to apply signals at said first and second signals to said excitation transformer, and a first non-linear signal mixer connected to said secondary winding and to said signal chopper means adapted to provide signals to said signal chopper means at a third frequency different from said first or said second frequencies; and wherein said signal output means includes a second non-linear signal mixer connected to said linear signal mixer and adapted to provide signals at said third frequency, said synchronous signal detector being coupled with said signal transformer and said second non-linear signal mixer.

8. A telemetry system in accordance with claim 6 wherein said excitation means includes means for applying excitation signals to said excitation transformer at a first frequency and means intermediate said secondary winding and said signal chopper means to provide said carrier frequency signals to said chopper means at a second frequency, and wherein said signal output means includes means for applying signals to said detector means at said second frequency.

9. A system in accordance with claim 8 wherein said signal transformer includes a secondary winding tuned to said second frequency.

10. A telemetry system comprising in combination: a rotor; a temperature sensing element carried by said rotor; a signal chopper coupled with said sensing element and carried by said rotor; first and second inductors respectively connected to the input circuit and output circuit of said signal chopper and carried by said rotor with the central axes of said inductors being coincident with the axis of said rotor; a third inductor disposed about said first inductor and maintained stationary with respect to said first inductor; an excitation amplifier connected to said third inductor; a carrier signal oscillator connected to said excitation amplifier; a fourth inductor disposed about said second inductor and maintained stationary with respect thereto; a signal amplifier connected to said fourth inductor; a demodulator connected to said signal amplifier and to said carrier signal oscillator; a low frequency filter network connected to said demodulator; and signal utilization means connected to said low frequency filter network.

11. A telemetry system comprising in combination: a transducer; a signal modulator; first and second inductors; a rotor having a central axial opening adapted to receive said modulator; means connecting said signal modulator in circuit with said transducer and with said first and second inductors to render said modulator responsive to modulating signals from said transducer and carrier signals from said first inductor to provide modulated carrier signals in said second inductor; third and fourth inductors maintained stationary with respect to said first and second inductors and maintained coaxial with respect to the axes of said first and second inductors, said second and third inductors being in energy exchange relationship and said first and fourth inductors being in energy exchange relationship; carrier signal excitation means connected to said fourth inductor including first and second carrier frequency oscillators and a linear signal mixer adapted to provide signals at first and second frequencies to said fourth inductor; a first nonlinear signal mixer carried by said rotor and connected to said signal modulator and to said first inductor adapted to apply signals to said signal modulator at a third frequency different from said first and second frequencies; a second nonlinear signal mixer connected to said linear signal mixer and to said signal amplification and demodulation means; and signal amplification and demodulation means connected to said third inductor responsive to modulated signals in said third inductor to provide demodulated output signals representative of the signals generated by said transducer.

12. A telemetry system comprising in combination: a transducer; a signal modulator; first and second inductors; a rotor having a central axial opening adapted to receive said modulator; means connecting said signal modulator in circuit with said transducer and with said first and second inductors to render said modulator responsive to modulating signals from said transducer and carrier signals from said first inductor to provide modulated carrier signals in said second inductor; third and fourth inductors maintained stationary with respect to said first and second inductors and maintained coaxial with respect to the axes of said first and second inductors, said second and third inductors being in energy exchange relationship and said first and fourth inductors being in energy exchange relationship; carrier signal excitation means connected to said fourth inductor including means providing signals to said fourth inductor at a first frequency; a first harmonic signal generator carried by said rotor and connected to said signal modulator and to said first inductor and responsive to signals at said first frequency to apply signals to said signal modulator at a frequency different from said first frequency; a second harmonic signal generator connected to said carrier signal excitation means and responsive to signals at said first frequency to provide signals at said different frequency; and signal amplification and demodulation means connected to said third inductor and to said second harmonic signal generator responsive to modulated signals in said third inductor to provide demodulated output signals representative of the signals generated by said transducer.

References Cited by the Examiner

UNITED STATES PATENTS 2,898,550    8/1959    Fischer _____ 340—195

NEIL C. READ, *Primary Examiner.*

THOMAS B. HABECKER, *Examiner.*